United States Patent [19]

Colao

[11] 4,021,754
[45] May 3, 1977

[54] VARIABLE CURVATURE OPTICS FOR LASERS

[75] Inventor: Angelo A. Colao, Bedford, Mass.

[73] Assignee: Sanders Associates, Inc., Nashua, N.H.

[22] Filed: Feb. 17, 1976

[21] Appl. No.: 658,218

[52] U.S. Cl. .................. 331/94.5 C; 331/94.5 T; 350/295
[51] Int. Cl.² .................................. H01S 3/086
[58] Field of Search .............. 331/94.5; 350/295

[56] References Cited

UNITED STATES PATENTS

| 3,299,368 | 1/1967 | Klebba | 331/94.5 |
| 3,580,082 | 5/1971 | Strack | 350/295 |
| 3,972,600 | 8/1976 | Cobarg | 350/295 |

Primary Examiner—William L. Sikes
Attorney, Agent, or Firm—Louis Etlinger; Richard I. Seligman

[57] ABSTRACT

Focus correction in a laser to compensate for thermal lensing effects in the laser rod is achieved by applying a system of loads to the H.R. mirror of the laser cavity to develop a deformation thereof that counteracts optical path distortion of the laser rod occasioned by the thermal lensing effects therein.

9 Claims, 4 Drawing Figures

VARIABLE CURVATURE OPTICS FOR LASERS

BACKGROUND OF THE INVENTION

This invention relates to variable curvature optics and more particularly to variable curvature optics for counteracting the thermal lensing effects in laser rods.

When a solid state laser is operated, the center of the rod thereof heats up more than the outer portions of the rod such that the ends of the rod acquire a curvature which is a function of the thermal gradient within the rod. This curvature of the rod at the ends thereof will decrease the area of rod over which the TEM$_{oo}$ mode output will occur. Therefore, the total laser output would require a mask to permit only the TEM$_{oo}$ mode portion of the beam to pass through into the environment. This course of action, of course, is very inefficient since only a small portion of the available output is used.

Another solution to the problem is to grind the laser rod ends or the H.R. mirror into a properly shaped lens to compensate for the distortions created by the thermal lensing effects. This type of correction is only satisfactory for one laser power setting. When the laser is to be operated over a range of power settings this compensation will not suffice.

SUMMARY OF THE INVENTION

Accordingly, it is an object of this invention to provide an improved laser.

It is another object of this invention to provide a laser having means therein for counteracting thermal lensing effects in laser rods.

It is a further object of this invention to provide a laser having variable control for counteracting the thermal lensing effects in laser rods.

Briefly, in one embodiment of the invention a laser is provided having an H.R. mirror therein and means for applying variable deformations to the mirror to counteract the distortion of the ends of the laser rod occasioned by thermal lensing effects therein.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
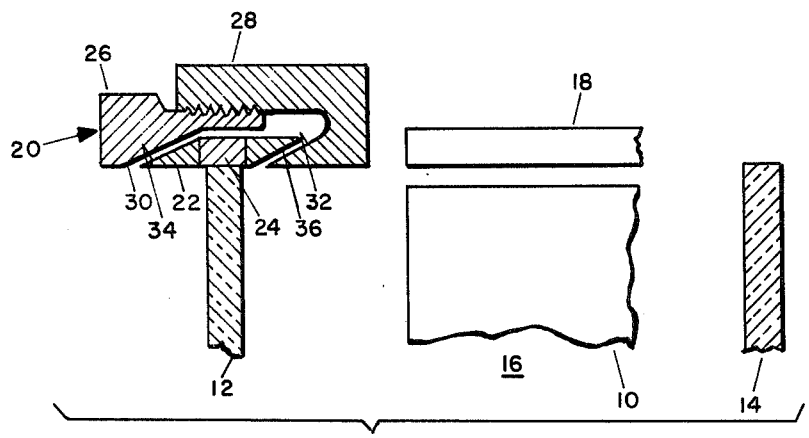
FIG. 1 is a partial sectional view of a laser having apparatus therein for providing controlled structural deformations to counteract thermal lensing effects in the laser rod.

Referring now to FIG. 1 of the drawings, there is illustrated thereby a laser having means for providing controlled distortion of an optical surface therein to counteract the thermal lensing effects in the laser rod. The laser rod 10 is bounded by a pair of mirrors 12 and 14 one of which is highly reflective and which form a resonant cavity 16 therebetween. The laser rod 10 may be any type of solid crystalline rod, for example, neodymium yttrium aluminum garnet (Nd:YAG). Laser rod 10 is pumped by a pump lamp 18 of any suitable type.

Figure 2:
FIG. 2 is a drawing illustrating schematically the loads applied to the H.R. mirror of the laser of FIG. 1.

Associated with mirror 12 is a device 20 for providing controlled distortion of the mirror to counteract the thermal lensing effects in the laser rod 10. Either or both mirrors may be distorted, however, there is apparently no advantage in deforming both mirrors. In this embodiment of the invention controlled distortion of mirror 12 is provided by arranging a slotted ring 22 about a holder 24 in which mirror 12 is mounted. Arranged relative to the slotted ring for cooperation therewith are a pair of nutlike members 26 and 28 having threads thereon for permitting mating between members 26 and 28. The members 26 and 28 have bevelled edges 30 and 32 for cooperating with bevelled edges 34 and 36 on the slotted ring 22. When the members 26 and 28 are rotated with respect to each other pressure is applied against the bevelled edges 34 and 36 of the slotted ring 22 to put an edge moment on the mirror 12 and thus, cause controlled distortion thereof. This edge moment is typically illustrated by the arrow 37 of FIG. 2.

By visually observing the beam emitted from the laser the user can adjust the members 26 and 28 to apply properly controlled distortion of mirror 12 so that the beam divergence will be minimized.

Figure 3:
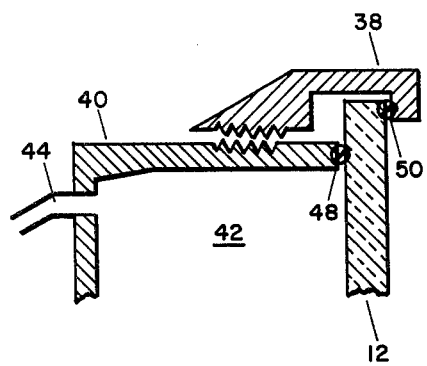
FIG. 3 is an alternate embodiment of the apparatus for providing structural controlled distortion to the laser of FIG. 1.
Figure 4:
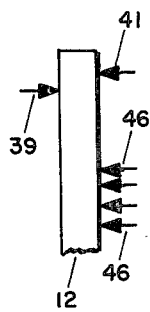
FIG. 4 is a drawing illustrating schematically the loading effects of the apparatus of FIG. 3.

An alternate embodiment to that of FIG. 1 is illustrated in FIG. 3 wherein members 38 and 40 are rotated with respect to one another to apply an edge moment to mirror 12 as illustrated by arrows 39 and 41 of FIG. 4.

As an alternative or addition to the edge moment created by members 38 and 40 the space 42 may be evacuated via an orifice 44 to apply a load to mirror 12 typified by the arrows 46 of FIG. 4. O-rings 48 and 50 provide sealing for the unit.

Loading of mirror 12 may also be accomplished by applying pressure to space 42 via orifice 44 instead of evacuating same. The means illustrated for applying loads to the edge of a mirror or about the edge of a mirror are merely representative. Other mechanisms which are hydraulic, Electomagnetic, thermally operated, etc., may be used. Thus, it is to be understood that the embodiments shown are to be regarded as illustrative only, and that many variations and modifications may be made without departing from the principles of the invention herein disclosed and defined by the appended claims.

I claim

1. A laser, comprising:
    a crystalline laser rod;
    a pair of mirrors;
    said laser rod being bounded by said mirrors and in optical alignment therewith forming a laser cavity therebetween;
    pumping means for pumping said laser rod; and
    means associated with one of said pair of mirrors for providing an out-of-plane deformation of said mirror at least during the time of lasing action of the laser.

2. A laser as defined in claim 1 wherein said means for providing an out-of-plane deformation of said mirror includes means for applying a load thereto.

3. A laser as defined in claim 2 wherein said means for applying a load to said mirror includes means for applying an edge moment to said mirror.

4. A laser as defined in claim 3 wherein said means for applying an edge moment to said mirror includes:
a ring having bevelled edges;
means for mounting said mirror in said ring; and
first and second mating nutlike members arranged about said ring and having bevelled surfaces which cooperate with the bevelled surfaces of said ring.

5. A laser as defined in claim 4 wherein said ring is slotted.

6. A laser as defined in claim 2 wherein said means for applying a load to said mirror includes means for establishing a pressure differential on either side of said mirror.

7. A laser as defined in claim 2 wherein said means for applying a load to said mirror includes first and second mating members having respectively, first and second surfaces which mate with the sides of said mirror such that relative rotation of said members produces a load on either side of said mirror.

8. A laser as defined in claim 7 further including means for establishing a pressure differential on either side of said mirror.

9. A method of compensating for thermal lensing effects in a laser rod contained with a cavity bounded by a pair of mirrors, comprising the steps of:
providing means for applying a load on one of the pair of mirrors to deform same;
observing the beam emitted by the laser; and
adjusting the load applied to the mirror to minimize beam divergence during lasing action by deforming the mirror to compensate for deformation of the laser rod.

* * * * *